US012274293B2

(12) United States Patent
Ratcliff

(10) Patent No.: US 12,274,293 B2
(45) Date of Patent: Apr. 15, 2025

(54) CANNABIS STORAGE ASSEMBLY

(71) Applicant: Tyrone Ratcliff, Los Angeles, CA (US)

(72) Inventor: Tyrone Ratcliff, Los Angeles, CA (US)

( * ) Notice: Subject to any disclaimer, the term of this patent is extended or adjusted under 35 U.S.C. 154(b) by 525 days.

(21) Appl. No.: 17/824,030

(22) Filed: May 25, 2022

(65) Prior Publication Data

US 2023/0380490 A1 Nov. 30, 2023

(51) Int. Cl.

| | |
|---|---|
| ***A45C 11/20*** | (2006.01) |
| ***A24F 15/08*** | (2006.01) |
| ***H04R 1/02*** | (2006.01) |

(52) U.S. Cl.

CPC ............ *A24F 15/08* (2013.01); *H04R 1/028* (2013.01)

(58) Field of Classification Search

CPC ......... A45C 11/20; A45C 15/00; A45C 13/02; A45C 5/065; H04R 1/028; H04R 1/025; H04R 1/02; H04R 2420/07; H04R 2420/09; F25D 23/12; F25D 2331/804; F25D 25/025; F25D 3/08

USPC ..... 206/542, 216; 62/331, 457.1, 457.7, 371

See application file for complete search history.

(56) References Cited

U.S. PATENT DOCUMENTS

| | | | | |
|---|---|---|---|---|
| 5,979,175 A * | 11/1999 | Ellison | H04B 1/086 62/457.7 |
| 7,325,940 B2 * | 2/2008 | Cea | A47F 3/001 362/104 |
| 7,854,319 B2 * | 12/2010 | Yau | B42D 3/123 206/472 |
| 9,402,420 B2 | 8/2016 | Barrett | |
| D818,640 S | 5/2018 | Kakoun | |
| 10,116,139 B2 | 10/2018 | Williams | |
| 10,194,688 B2 * | 2/2019 | Roberto, Jr. | A24B 7/06 |
| 2013/0156251 A1 | 6/2013 | Noble | |
| 2016/0081390 A1 | 3/2016 | Ackerman | |
| 2017/0224011 A1 * | 8/2017 | Shevtsov | F21S 9/02 |
| 2019/0125626 A1 * | 5/2019 | Mejia | A61J 7/04 |

FOREIGN PATENT DOCUMENTS

| | | |
|---|---|---|
| WO | WO202019337 | 10/2020 |

* cited by examiner

*Primary Examiner* — King M Chu

(57) ABSTRACT

A *cannabis* storage assembly for storing objects related to *cannabis* consumption and playing music includes a box that has a pair of drawers each slidably integrated into the box and a lid hingedly coupled to the box for opening and closing the box. An audio unit is integrated into the lid and the audio unit emits audible sounds when the audio unit is turned on. A set of first light emitters is each integrated into the lid and each of the first light emitters is oriented to emit light upwardly from the lid. A set of second light emitters is each integrated into the lid and each of the second light emitters is oriented to emit light downwardly from the lid.

9 Claims, 4 Drawing Sheets

(ISO Top View)

(ISO Top View)

(Detail View)

(In-Use View)

(Block Diagram)

CANNABIS STORAGE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to storage devices and more particularly pertains to a new storage device for storing objects relating to *cannabis* consumption and playing music. The device includes a box with a pair of drawers for storing *cannabis* products and *cannabis* accessories. The device includes an audio unit integrated into the box that can stream audio from a personal electronic device or other audio source.

(2) Description of Related Art Including Information Disclosed Under 37 CFR 1.97 and 1.98

The prior art relates to storage devices including a smoking accessory kit that includes a tray, a plurality of magnets attached to the tray and a plurality of magnetic attachments that can engage the magnets. The prior art discloses a fishing tackle box device that includes light emitting diodes, solar panels and a battery for charging a smart phone. The prior art discloses a *cannabis* management device that includes a *cannabis* grinder, a lighter and a pipe integrated into a case. The prior art discloses a speaker system that is mountable to a utility bag. The prior art discloses a smoker's kit that includes a container and a plurality of tools contained in the container relating to smoking tobacco. The prior art discloses a rolling box device that includes a box with a rolling surface for rolling a cigarette and a plurality of light emitters integrated into the box.

BRIEF SUMMARY OF THE INVENTION

An embodiment of the disclosure meets the needs presented above by generally comprising a box that has a pair of drawers each slidably integrated into the box and a lid hingedly coupled to the box for opening and closing the box. An audio unit is integrated into the lid and the audio unit emits audible sounds when the audio unit is turned on. A set of first light emitters is each integrated into the lid and each of the first light emitters is oriented to emit light upwardly from the lid. A set of second light emitters is each integrated into the lid and each of the second light emitters is oriented to emit light downwardly from the lid.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
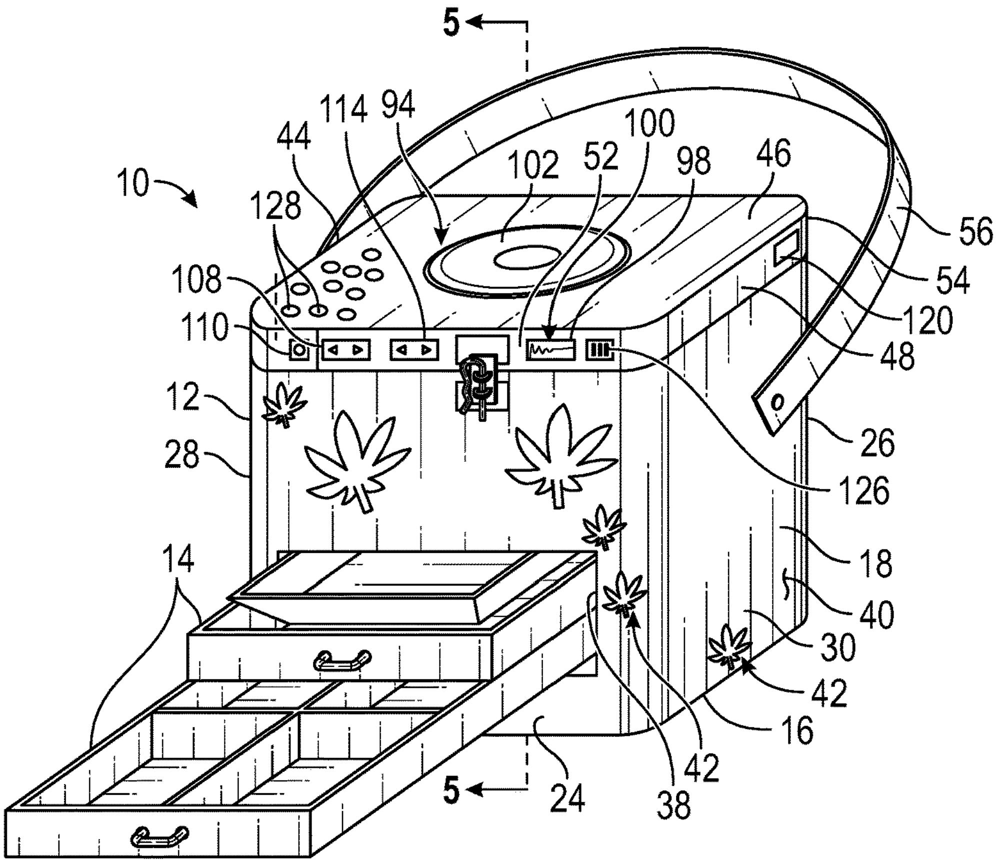
FIG. 1 is a front perspective view of a *cannabis* storage assembly according to an embodiment of the disclosure.
Figure 2:
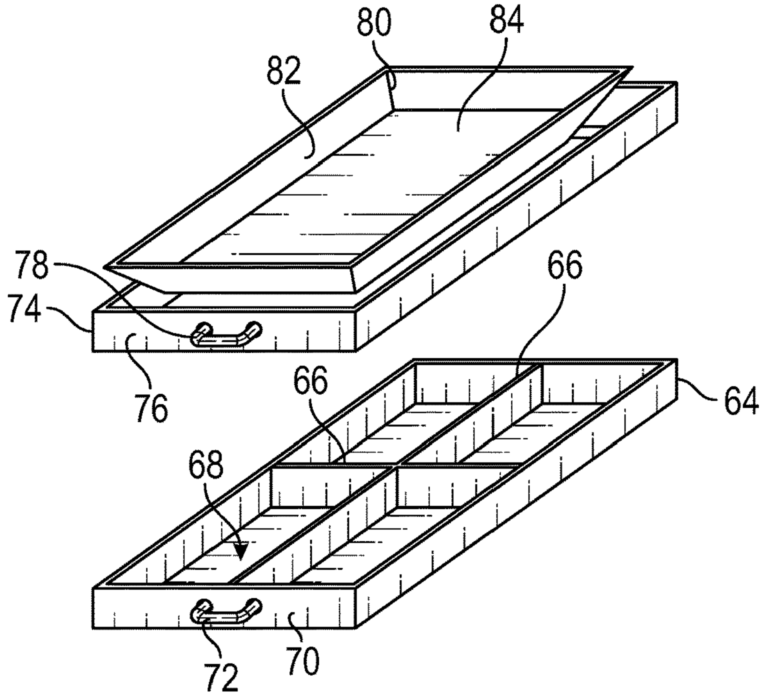
FIG. 2 is a perspective view of a pair of drawers of an embodiment of the disclosure.
Figure 3:
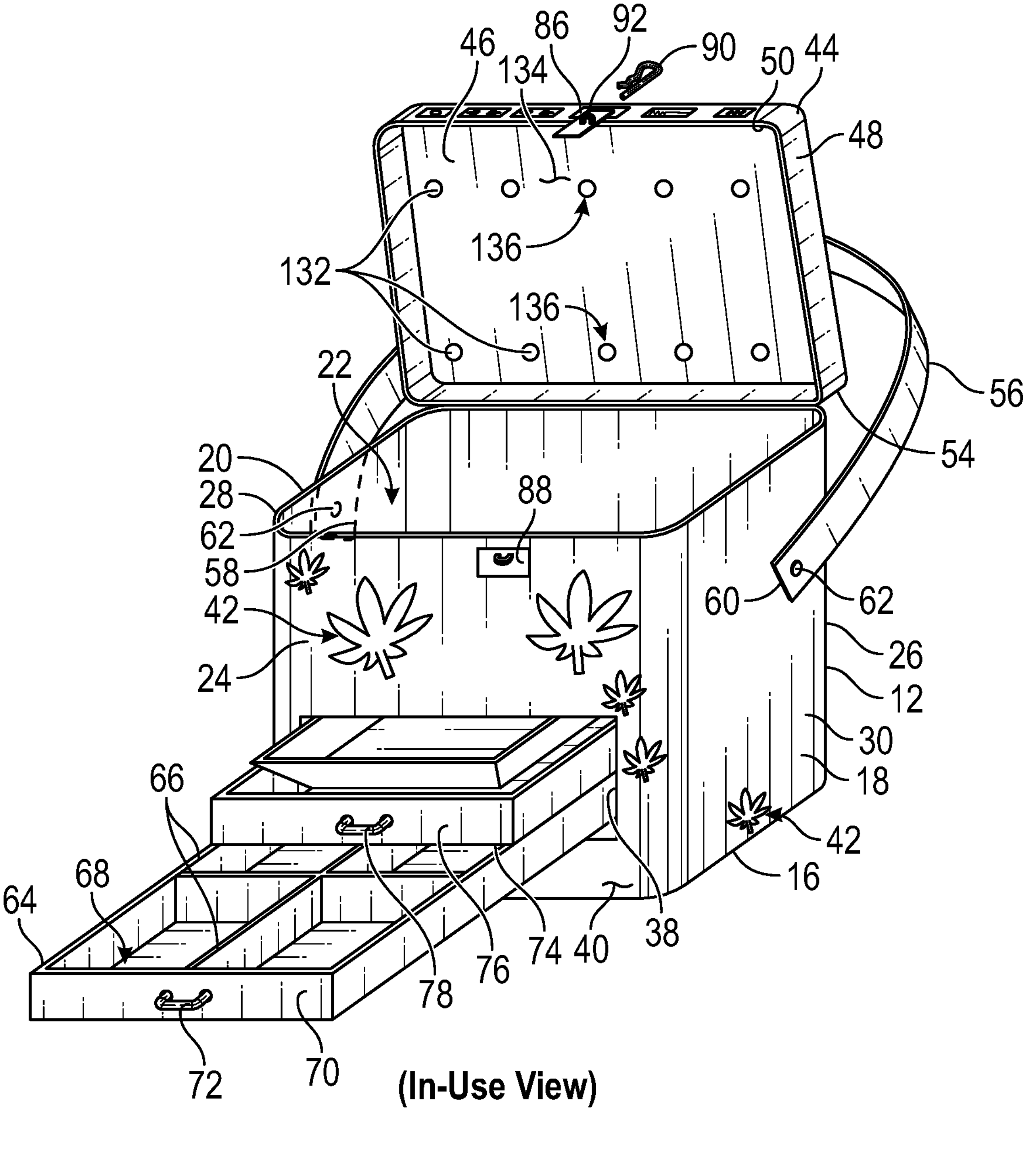
FIG. 3 is a perspective view of an embodiment of the disclosure.
Figure 4:
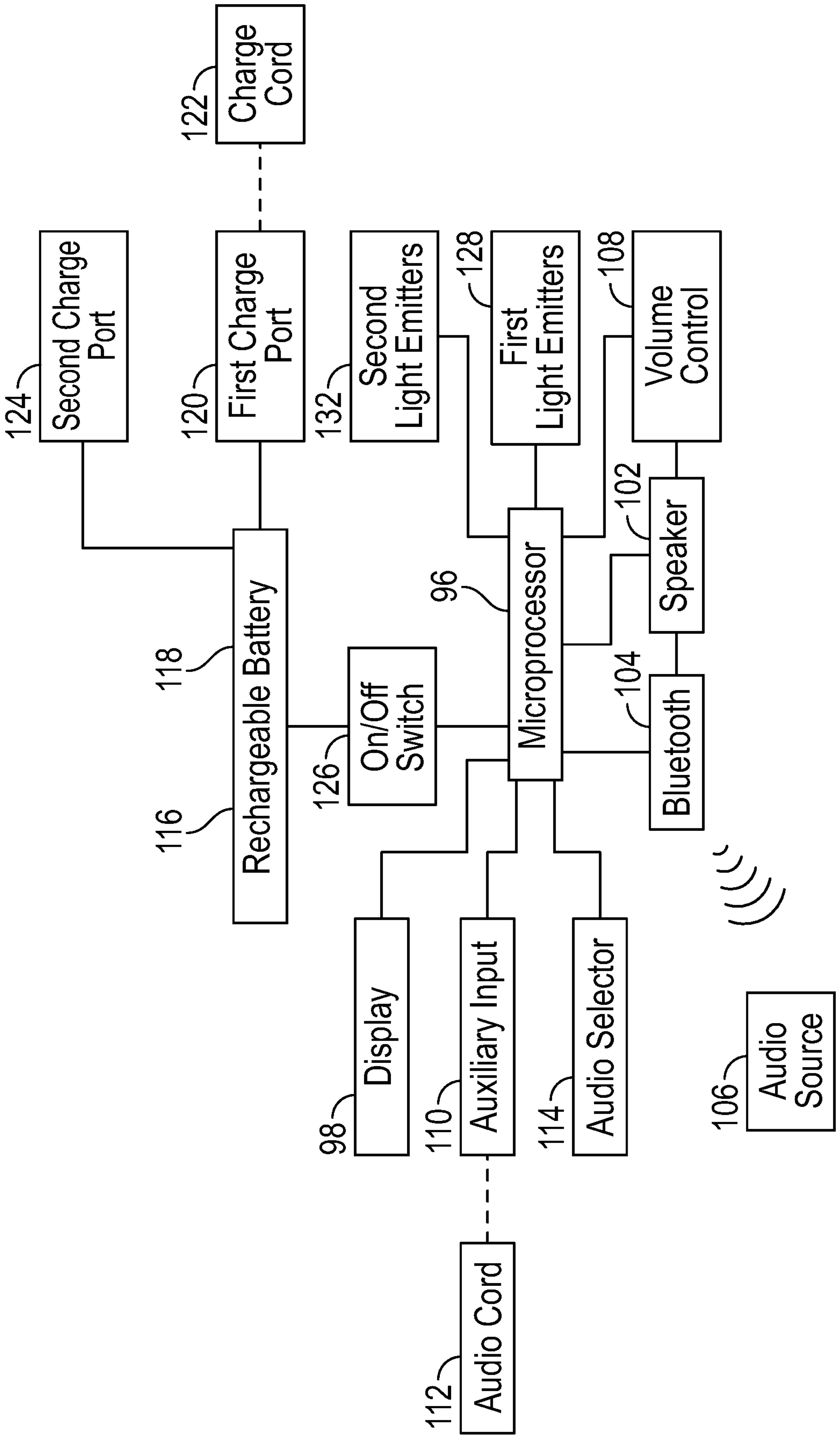
FIG. 4 is a schematic view of an embodiment of the disclosure.
Figure 5:
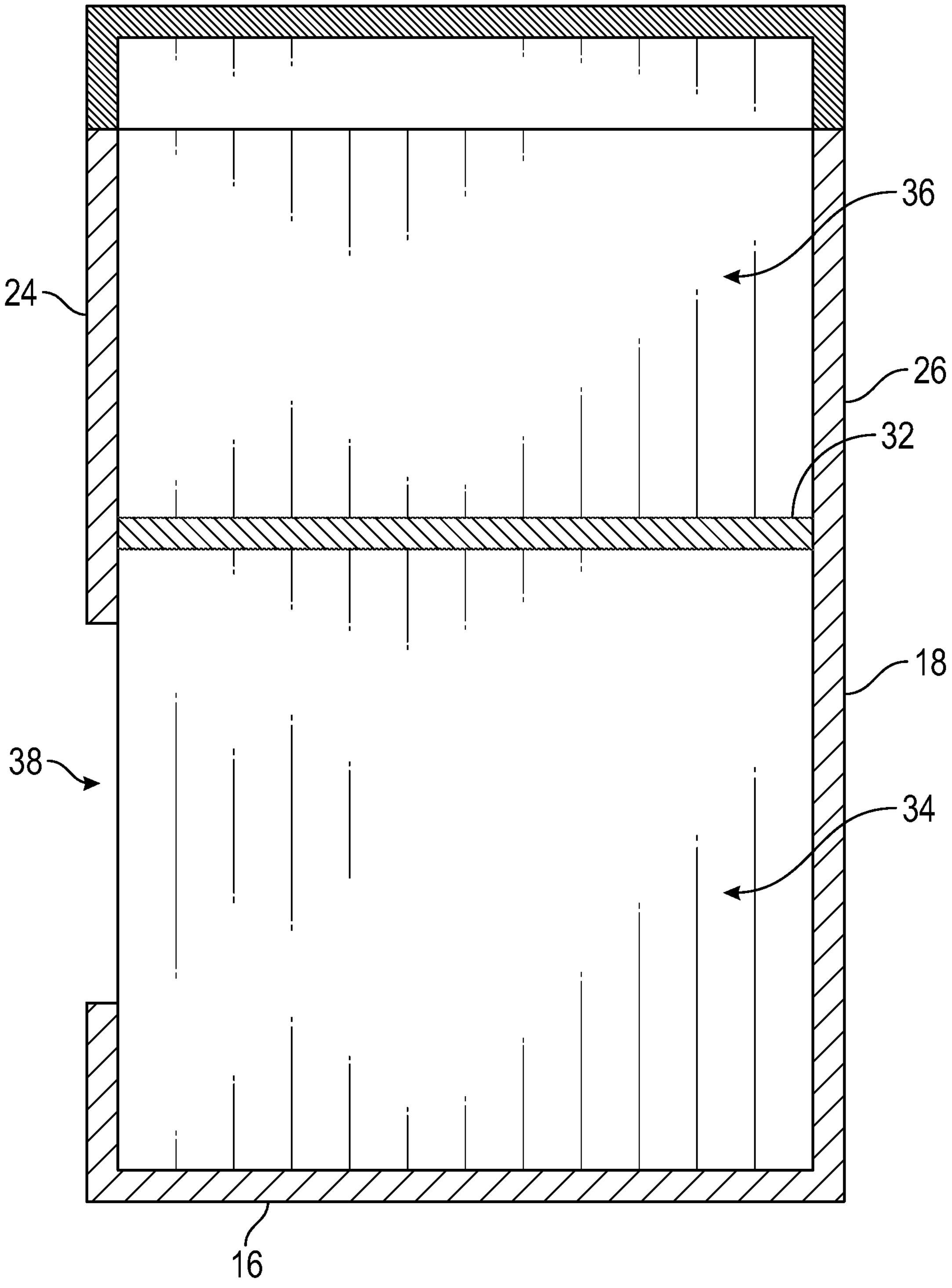
FIG. 5 is a cross sectional view taken from line 5-5 of FIG. 1 of an embodiment of the disclosure.

With reference now to the drawings, and in particular to FIGS. 1 through 5 thereof, a new storage device embodying the principles and concepts of an embodiment of the disclosure and generally designated by the reference numeral 10 will be described.

As best illustrated in FIGS. 1 through 5, the *cannabis* storage assembly 10 generally comprises a box 12 that has a pair of drawers 14 each is slidably integrated into the box 12, and the box 12 has a bottom wall 16 and a perimeter wall 18 extending upwardly from the bottom wall 16. The perimeter wall 18 has a top edge 20 defining an opening 22 into the box 12, and the perimeter wall 18 has a front side 24, a back side 26, a first lateral side 28 and a second lateral side 30. The box 12 has a dividing wall 32 that is positioned between the bottom wall 16 and the top edge 20. The dividing wall 32 defines a drawer space 34 extending between the dividing wall 32 and the bottom wall 16, and the dividing wall 32 defines a storage space 36 between the dividing wall 32 and the top edge 20.

The front side 24 of the perimeter wall 18 has a drawer opening 38 extending into the drawer space 34. The drawer opening 38 is elongated to extend across a substantial width of the front side 24. Additionally, the perimeter wall 18 has an outer surface 40 and indicia 42 are printed on the outer surface 40. The indicia 42 comprise images of *cannabis* leaves in various sizes.

A lid 44 is hingedly coupled to the box 12 for opening and closing the box 12. The lid 44 has a top wall 46 and an outer wall 48 extending downwardly from the top wall 46, and the outer wall 48 has a bottom edge 50, a forward side 52 and a rear side 54. The bottom edge 50 corresponding to the rear side 54 is hingedly coupled to the top edge of the perimeter wall 18 of the box 12 corresponding to the back side 26 of the perimeter wall 18. Furthermore, the bottom edge 50 lies on the top edge 20 when the lid 44 is closed. A strap 56 is provided which has a first end 58 and a second end 60, and the strap 56 a pair of pivot points 62 each located adjacent to a respective first end 58 and second end 60. Each of the pivot points 62 is pivotally coupled to a respective first lateral side 28 and second lateral side 30 of the perimeter wall 18 of the box 12 such that the strap 56 forms a loop for carrying the box 12.

The pair of drawers 14 includes a first drawer 64 is slidably integrated into the box 12 for storing objects commonly associated with *cannabis* consumption. The first drawer 64 has a pair of dividers 66 that are perpendicularly oriented with each other to define a plurality of storage spaces 68 in the first drawer 64. The first drawer 64 has a front wall 70 and the first drawer 64 has a handle 72 which is attached to the front wall 70. The first drawer 64 is slidably positioned in the drawer opening 38 in the front side 24 of the perimeter wall 18 of the box 12, and the front wall 70 is oriented flush with the front side 24 when the first drawer 64 is closed.

The pair of drawers 14 includes a second drawer 74 that is slidably integrated into the box 12 for storing objects commonly associated with *cannabis* consumption. The second drawer 74 has a forward wall 76 and the second drawer 74 has a handle 78 that is attached to the forward wall 76. The second drawer 74 is slidably positioned in the drawer opening 38 in the front side 24 of the perimeter wall 18 of the box 12 and the forward wall 76 is oriented flush with the front side 24 when the second drawer 74 is closed. Furthermore, the second drawer 74 is positioned on top of the first drawer 64. A rolling tray 80 is positionable on the second drawer 74 for storing the rolling tray 80 and the rolling tray 80 is removable from the second drawer 74. The rolling tray 80 has a perimeter wall 82 angling upwardly from a basal wall 84 such that the perimeter wall 82 of the rolling tray 80 inhibits *cannabis* placed on the rolling tray 80 from spilling off of the rolling tray 80.

A latch 86 is hingedly coupled to the forward side 52 of the outer wall 48 of the lid 44. An engagement 88 is attached to the front side 24 of the perimeter wall 18 of the box 12. The latch 86 engages the engagement 88 when the latch 86 is in a closed position for retaining the lid 44 in a closed position. Additionally, a cotter pin 90 is extendable through a catch 92 on the latch 86 and the engagement 88 for retaining the latch 86 in the closed position.

An audio unit 94 is integrated into the lid 44 and the audio unit 94 emits audible sounds when the audio unit 94 is turned on. The audio unit 94 comprises a control circuit 96 that is integrated into the lid 44 and the audio unit 94 includes a display 98 that is integrated into the forward side 52 of the outer wall 48 of the lid 44. The display 98 is electrically coupled to the control circuit 96 and the display 98 displays indicia 100 comprising operational parameters of the audio unit 94. The audio unit 94 includes a speaker 102 that is integrated into the top wall 46 of the lid 44 such that the speaker 102 emits audible sounds outwardly from the top wall 46 and the speaker 102 is electrically coupled to the control circuit 96.

The audio unit 94 includes a transceiver 104 that is integrated into the lid 44 and the transceiver 104 is electrically coupled to the control circuit 96. The transceiver 104 is in wireless communication with an audio source 106 thereby facilitating the speaker 102 to receive an audio signal from the audio source 106. The transceiver 104 may comprise a radio frequency transceiver or the like and the transceiver 104 may employ Bluetooth communication protocols. Additionally, the audio source 106 may comprise a smart phone or other similar electronic source of digital streaming media.

The audio unit 94 includes a volume control 108 which is integrated into the forward side 52 of the outer wall 48 of the lid 44. The volume control 108 is electrically coupled to the control circuit 96 and the volume control 108 adjusts a volume of the speaker 102 between a minimum volume and a maximum volume. The audio unit 94 includes an input port 110 that is recessed into the forward side 52 of the perimeter wall 18 of the lid 44 thereby facilitating the input port 110 to receive an audio cord 112. The input port 110 is electrically coupled to the control circuit 96 thereby facilitating the speaker 102 to receive an audio signal from the audio cord 112. Additionally, the input port 110 may be a quarter inch stereo jack or other similar audio input port. The audio unit 94 includes an audio selection switch 114 that is movably integrated into the forward side 52 of the outer wall 48 of the lid 44. The audio selection switch 114 is electrically coupled to the control circuit 96 and the audio selection switch 114 selects either the input port 110 or the transceiver 104 as an audio source 106 for the speaker 102.

The audio unit 94 includes a power supply 116 that is integrated into the lid 44 and the power supply 116 is electrically coupled to the control circuit 96. The power supply 116 comprises a rechargeable battery 118 that is integrated into the lid 44 and the rechargeable battery 118 is electrically coupled to the control circuit 96. The power supply 116 includes a first charge port 120 that is recessed into the perimeter wall 18 of the lid 44 thereby facilitating the first charge port 120 to insertably receive a charge cord 122. Additionally, the first charge port 120 is electrically coupled to the rechargeable battery 118 for charging the rechargeable battery 118.

The power supply 116 includes a second charge port 124 that is recessed into the outer wall 48 of the lid 44 thereby facilitating the second charge port 124 to insertably receive a power cord for an electronic device. The second charge port 124 is electrically coupled to the rechargeable battery 118 for charging the electronic device with the rechargeable battery 118. The power supply 116 includes a power switch 126 that is movably integrated into the forward side 52 of the outer wall 48 of the lid 44, the power switch 126 is electrically coupled to the control circuit 96 and the power switch 126 turns the control circuit 96 on and off.

A set of first light emitters 128 is each integrated into the lid 44 and each of the first light emitters 128 is oriented to emit light upwardly from the lid 44. Each of the first light emitters 128 is positioned on a top surface 130 of the top wall 46 of the lid 44 and each of the first light emitters 128 is electrically coupled to the control circuit 96. Additionally, each of the first light emitters 128 may comprise a light emitting diode or other type of electronic light emitter.

A set of second light emitters 132 is each integrated into the lid 44 and each of the second light emitters 132 is oriented to emit light downwardly from the lid 44. Each of the second light emitters 132 is positioned on a bottom surface 134 of the top wall 46 of the lid 44 and the set of second light emitters 132 is arranged into a pair of rows 136 extending laterally across the bottom surface 134. Each of the second light emitters 132 is electrically coupled to the control circuit 96 and each of the second light emitters 132 may comprise a light emitting diode or the like.

In use, various objects related to the consumption of *cannabis* are stored in the box 12 as well as in the first drawer 64 and the second drawer 74. The rolling tray 80 can be taken out of the second drawer 74 for rolling *cannabis* cigarettes, for example. Additionally, audio can be played with the audio unit 94 from either a wireless source or a wired source. In this way the box 12 and the audio unit 94 facilitate *cannabis* to be consumed along with the ability to listen to music.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A *cannabis* storage assembly for storing products and tools associated with *cannabis* consumption, said assembly comprising:

a box having a pair of drawers each being slidably integrated into said box;

a lid being hingedly coupled to said box for opening and closing said box;

an audio unit being integrated into said lid, said audio unit emitting audible sounds when said audio unit is turned on;

a set of first light emitters, each of said first light emitters being integrated into said lid, each of said first light emitters being oriented to emit light upwardly from said lid;

a set of second light emitters, each of said second light emitters being integrated into said lid, each of said second light emitters being oriented to emit light downwardly from said lid;

wherein said box has a bottom wall and a perimeter wall extending upwardly from said bottom wall, said perimeter wall having a top edge defining an opening into said box, said perimeter wall having a front side, a back side, a first lateral side and a second lateral side;

wherein said box has a dividing wall being positioned between said bottom wall and said top edge, said dividing wall defining a drawer space extending between said dividing wall and said bottom wall, said dividing wall defining a storage space between said dividing wall and said top edge;

wherein said front side of said perimeter wall has a drawer opening extending into said drawer space, said drawer opening being elongated to extend across a substantial width of said front side; and wherein said perimeter wall has an outer surface, said outer surface having indicia being printed thereon, said indicia comprising images of *cannabis* leaves; and said lid has a top wall and an outer wall extending downwardly from said top wall, said outer wall having a bottom edge, a forward side and a rear side, said bottom edge corresponding to said rear side being hingedly coupled to said top edge of said perimeter wall of said box corresponding to said back side of said perimeter wall, said bottom edge lying on said top edge when said lid is closed.

2. The assembly according to claim 1, wherein said pair of drawers includes a first drawer being slidably integrated into said box for storing objects commonly associated with *cannabis* consumption, said first drawer having a pair of dividers being perpendicularly oriented with each other to define a plurality storage spaces in said first drawer, said first drawer having a front wall, said first drawer having a handle being attached to said front wall, said first drawer being slidably positioned in said drawer opening in said front side of said perimeter wall of said box, said front wall being oriented flush with said front side when said first drawer is closed.

3. The assembly according to claim 2, wherein:

said pair of drawers includes a second drawer being slidably integrated into said box for storing objects commonly associated with *cannabis* consumption, said second drawer having a forward wall, said second drawer having a handle being attached to said forward wall, said second drawer being slidably positioned in said drawer opening in said front side of said perimeter wall of said box, said forward wall being oriented flush with said front side when said second drawer is closed, said second drawer being positioned on top of said first drawer; and said assembly includes a rolling tray being positionable on said second drawer for storing said rolling tray, said rolling tray being removably from said second drawer, said rolling tray having a perimeter wall angling upwardly from a basal wall such that said perimeter wall of said rolling tray inhibits *cannabis* placed on said rolling tray from spilling off of said rolling tray.

4. The assembly according to claim 1, wherein said audio unit comprises:

a control circuit being integrated into said lid;

a display being integrated into said forward side of said perimeter wall of said lid, said display being electrically coupled to said control circuit, said display displaying indicia comprising operational parameters of said audio unit; and a speaker being integrated into said top wall of said lid such that said speaker emits audible sounds outwardly from said top wall, said speaker being electrically coupled to said control circuit.

5. The assembly according to claim 4, wherein said audio unit includes:

a transceiver being integrated into said lid, said transceiver being electrically coupled to said control circuit, said transceiver being in wireless communication with an audio source thereby facilitating said speaker to receive an audio signal from the audio source;

a volume control being integrated into said forward side of said perimeter wall of said lid, said volume control being electrically coupled to said control circuit, said volume control adjusting a volume of said speaker between a minimum volume and a maximum volume;

an input port being recessed into said forward side of said perimeter wall of said lid thereby facilitating said input port to receive an audio cord, said input port being electrically coupled to said control circuit thereby facilitating said speaker to receive an audio signal from the audio cord; and an audio selection switch being movably integrated into said forward side of said perimeter wall of said lid, said audio selection switch being electrically coupled to said control circuit, said audio selection switch selecting either said input port or said transceiver as an audio source for said speaker.

6. The assembly according to claim 4, further comprising a power supply being integrated into said lid, said power supply being electrically coupled to said control circuit, said power supply comprising:

a rechargeable battery being integrated into said lid, said rechargeable battery being electrically coupled to said control circuit;

a first charge port being recessed into said perimeter wall of said lid thereby facilitating said first charge port to insertably receive a charge cord, said first charge port being electrically coupled to said rechargeable battery for charging said rechargeable battery;

a second charge port being recessed into said perimeter wall of said lid thereby facilitating said second charge port to insertably receive a power cord for an electronic device, said second charge port being electrically coupled to said rechargeable battery for charging the electronic device with said rechargeable battery; and a power switch being movably integrated into said forward side of said perimeter wall of said lid, said power switch being electrically coupled to said control circuit, said power switch turning said control circuit on and off.

7. The assembly according to claim 4, wherein each of said first light emitters is positioned on a top surface of said top wall of said lid, each of said first light emitters being electrically coupled to said control circuit.

8. The assembly according to claim 4, wherein each of said second light emitters is positioned on a bottom surface of said top wall of said lid, said set of second light emitters being arranged into a pair of rows extending laterally across said bottom surface, each of said second light emitters being electrically coupled to said control circuit.

9. A *cannabis* storage assembly for storing products and tools associated with *cannabis* consumption, said assembly comprising:

a box having a pair of drawers each being slidably integrated into said box, said box having a bottom wall and a perimeter wall extending upwardly from said bottom wall, said perimeter wall having a top edge defining an opening into said box, said perimeter wall having a front side, a back side, a first lateral side and a second lateral side, said box having a dividing wall being positioned between said bottom wall and said top edge, said dividing wall defining a drawer space extending between said dividing wall and said bottom wall, said dividing wall defining a storage space between said dividing wall and said top edge, said front side of said perimeter wall having a drawer opening extending into said drawer space, said drawer opening being elongated to extend across a substantial width of said front side, said perimeter wall having an outer surface, said outer surface having indicia being printed thereon, said indicia comprising images of *cannabis* leaves;

a lid being hingedly coupled to said box for opening and closing said box, said lid having a top wall and an outer wall extending downwardly from said top wall, said outer wall having a bottom edge, a forward side and a rear side, said bottom edge corresponding to said rear side being hingedly coupled to said top edge of said perimeter wall of said box corresponding to said back side of said perimeter wall, said bottom edge lying on said top edge when said lid is closed;

wherein said pair of drawers includes a first drawer being slidably integrated into said box for storing objects commonly associated with *cannabis* consumption, said first drawer having a pair of dividers being perpendicularly oriented with each other to define a plurality storage spaces in said first drawer, said first drawer having a front wall, said first drawer having a handle being attached to said front wall, said first drawer being slidably positioned in said drawer opening in said front side of said perimeter wall of said box, said front wall being oriented flush with said front side when said first drawer is closed;

wherein said pair of drawers includes a second drawer being slidably integrated into said box for storing objects commonly associated with *cannabis* consumption, said second drawer having a forward wall, said second drawer having a handle being attached to said forward wall, said second drawer being slidably positioned in said drawer opening in said front side of said perimeter wall of said box, said forward wall being oriented flush with said front side when said second drawer is closed, said second drawer being positioned on top of said first drawer;

a rolling tray being positionable on said second drawer for storing said rolling tray, said rolling tray being removably from said second drawer, said rolling tray having a perimeter wall angling upwardly from a basal wall such that said perimeter wall of said rolling tray inhibits *cannabis* placed on said rolling tray from spilling off of said rolling tray;

an audio unit being integrated into said lid, said audio unit emitting audible sounds when said audio unit is turned on, said audio unit comprising:

a control circuit being integrated into said lid;

a display being integrated into said forward side of said perimeter wall of said lid, said display being electrically coupled to said control circuit, said display displaying indicia comprising operational parameters of said audio unit;

a speaker being integrated into said top wall of said lid such that said speaker emits audible sounds outwardly from said top wall, said speaker being electrically coupled to said control circuit;

a transceiver being integrated into said lid, said transceiver being electrically coupled to said control circuit, said transceiver being in wireless communication with an audio source thereby facilitating said speaker to receive an audio signal from the audio source;

a volume control being integrated into said forward side of said perimeter wall of said lid, said volume control being electrically coupled to said control circuit, said volume control adjusting a volume of said speaker between a minimum volume and a maximum volume;

an input port being recessed into said forward side of said perimeter wall of said lid thereby facilitating said input port to receive an audio cord, said input port being electrically coupled to said control circuit thereby facilitating said speaker to receive an audio signal from the audio cord;

an audio selection switch being movably integrated into said forward side of said perimeter wall of said lid, said audio selection switch being electrically coupled to said control circuit, said audio selection switch selecting either said input port or said transceiver as an audio source for said speaker; and a power supply being integrated into said lid, said power supply being electrically coupled to said control circuit, said power supply comprising:

a rechargeable battery being integrated into said lid, said rechargeable battery being electrically coupled to said control circuit;

a first charge port being recessed into said perimeter wall of said lid thereby facilitating said first charge port to insertably receive a charge cord, said first charge port being electrically coupled to said rechargeable battery for charging said rechargeable battery;

a second charge port being recessed into said perimeter wall of said lid thereby facilitating said second charge port to insertably receive a power cord for an electronic device, said second charge port being electrically coupled to said rechargeable battery for charging the electronic device with said rechargeable battery; and a power switch being movably integrated into said forward side of said perimeter wall of said lid, said power switch being electrically coupled to said control circuit, said power switch turning said control circuit on and off; and a set of first light emitters, each of said first light emitters being integrated into said lid, each of said first light emitters being oriented to emit light upwardly from said lid, each of said first light emitters being positioned on a top surface of said top wall of said lid, each of said first light emitters being electrically coupled to said control circuit; and a set of second light emitters, each of said second light emitters being integrated into said lid, each of said second light emitters being oriented to emit light downwardly from said lid, each of said second light emitters being positioned on a bottom surface of said top wall of said lid, said set of second light emitters being arranged into a pair of rows extending laterally across said bottom surface, each of said second light emitters being electrically coupled to said control circuit.

* * * * *